Patented Oct. 14, 1924.

1,511,461

UNITED STATES PATENT OFFICE.

FRANK E. GREENWOOD, OF NEW ROCHELLE, NEW YORK, ASSIGNOR TO PINE WASTE PRODUCTS, INC., OF NEW YORK, N. Y., A CORPORATION OF DELAWARE.

ROSIN MANUFACTURE.

No Drawing. Application filed August 25, 1920, Serial No. 405,922. Renewed December 3, 1923.

*To all whom it may concern:*

Be it known that I, FRANK E. GREENWOOD, a citizen of the United States, and a resident of New Rochelle, Westchester County, and State of New York, have invented certain new and useful Improvements in Rosin Manufacture, of which the following is a specification.

This invention relates to the manufacture of hard rosin; and it comprises a method of recovering a hard pale rosin of high grade from various resinous materials obtained from coniferous wood, or directly from such wood itself, wherein the acid components of the resin are converted into ammonium salts (or ammonium soaps) in solution and the solution is then extracted with a hydrocarbon or other solvent to obtain certain resinous acids, dissolved therein; the solution so obtained being subsequently distilled to regain the solvent and produce a residue of pale hard rosin of high grade; as in extracting wood with ammonia solution and thereafter extracting the ammonia solution with a solvent immiscible therewith, such as turpentine, gasoline or petroleum ether, the solution so obtained being subsequently distilled to recover hard rosin and the solvent; all as more fully hereinafter set forth and as claimed.

The resins, terpenes and resinous matters contained in various coniferous woods, such as southern pine, are many and of various characters; some being of more or less acid nature. They range all the way from spirits of turpentine and pine oil, which are neutral to rosin which is chiefly abietic acid. Many of these bodies are subject to alteration by oxidation with the production of secondary materials which are also found in the wood. The highest grade rosin is ordinarily obtained by distillation of pure gum turpentine, an exudate produced on tapping pine trees. This exudate may be regarded as a solution of rosin in spirits of turpentine. On distilling, the turpentine is regained and the rosin is left behind as a residue. Upon the purity and cleanness of the original exudate depends very largely the commercial grade of the rosin thus obtained. "Virgin gum", the exudate obtained on first tapping the trees, yields a pale nearly colorless rosin of the highest grade. Subsequent tappings produce a rosin of lower grade. In modern methods of utilizing pine waste it is common to treat it with various hydrocarbon solvents, for example gasoline. The solvent takes out the turpentine and the rosin but it also extracts many other substances. On distilling to regain the solvent and the turpentine, the rosin left behind is of relatively low grade on account of the presence of such other substances.

It is the object of the present invention to produce a high grade rosin from these extracts or directly from the wood itself. To this end I take advantage of a difference in the acidity in the various resinous materials contained in the wood. The components of high grade pale rosin are mostly of distinctly acid nature. While there are probably several of these acid bodies present including anhydrids of various acids, it is common to call the acid body of high grade rosin "abietic acid" and I shall adopt this name here without any theory as to my material being the chemical individual known in the textbooks as abietic acid. Abietic acid readily forms an ammonium salt or ammonium soap; it goes into solution in water of ammonia. The other resinous and turpentine constituents of coniferous resins do not do this with equal readiness. But, as I have found, while abietic acid forms an ammonium salt or soap yet this soap in aqueous solution is so far dissociated that on shaking an aqueous solution of the soap with a rosin solvent immiscible therewith, such as gasoline, turpentine, the solvent disclosed in Clope Patent No. 1,144,171, June 22, 1915, etc. the acid bodies are extracted from it, and on distilling off the solvent from the solution thus obtained, a residue is left of pure, hard pale rosin or "abietic acid". On this fact the present method is based.

In purifying commercial rosin I treat it with a weak water solution of ammonia and separate the undissolved portions. The water solution is next shaken out with gasoline, turpentine, Clope's solvent etc. Or I may take the crude resins left after distilling an extract from pine wood with any of the ordinary solvents. In another and advantageous embodiment of my invention I simply extract the wood itself, which is best "lightwood", with a weak solution or ammonia in water.

In practicing the last mentioned embodiment of my invention I may digest the wood, cut into chips of the ordinary paper mill size with a 5 per cent solution of ammonia. Ordinarily, I employ a quantity of the ammonia solution equal to about eight times the dry weight of the wood. Digestion is usually for a period of three hours with a temperature of 70° C. At the end of the digestion, the ammoniacal liquid is drained off the wood, and, with lightwood, on cooling it will be found to set to a jelly-like consistency. The ammoniacal liquid or jelly is then agitated with a volatile solvent, such for instance as turpentine or gasoline. In the course of this agitation, a transformation takes place which is made evident by a sudden change in the nature of the sound of the shaking liquor on impact,—the change being from a soft sound, such as is observed in shaking oil or emulsions to a harder sound, such as is produced by the splashing of water.

After this change the liquid is allowed to stand, whereupon it separates quickly into two layers, the upper consisting of solvent colored by matter extracted from the liquor and the lower consisting of aqueous liquor containing ammonia and colored by organic matter extracted from the wood.

The solvent layer containing the abietic acid is drained off and distilled to remove the solvent. The residue of this distillation is then heated to a temperature of about 100° C. to expel the moisture and when allowed to cool sets to a good commercial grade of rosin.

The volatile solvent for the abietic acid thus removes the abietic acid from the ammonium salt but apparently does not decompose the ammonium salts of other organic acids derived from the lignin, the latter therefore remaining in the watery layer. The extraction of the rosin is thus readily accomplished and in an entirely feasible and commercial way.

In another and advantageous embodiment of my invention I extract high grade rosin from the crude material skimmed off black liquors produced in making paper pulp from coniferous woods by the alkali methods. As is well known, a resinous soapy mixture can often be skimmed off such black liquor. In and of itself it is regarded as being of no utility and it is mostly simply burnt to get rid of it. I have found that this material may be used in the present process. In so doing I decompose the soapy mass with a mineral acid, such as sulphuric acid or with an organic acid, such as acetic acid. This separates the abietic acid present from the soda or other alkali with which it is combined.

The crude acid resin mass precipitated by the acid after the aqueous portion of the mixture has been drawn off is then agitated with the weak ammonia as before to bring the abietic acid into the form of its ammonium salt or soap. The ammoniacal solution thus obtained is then shaken as in the instance first described, with a volatile solvent, such as turpentine or gasoline, which is immiscible with water, the separation which takes place being recognized by the change in the nature of the sound of the splashing liquor. After settling, the solvent layer is drained off and the solvent removed by distillation. The residue may be dried by heat and may be used in that condition or may be further purified.

After extraction of the ammoniacal liquor, ammonia may be regained therefrom in any of the usual ways. The liquid may, for example, be treated with soda ash in slight excess and redistilled, thereby giving a residue of resin soaps and a distillate containing the ammonia which may be reused. Or a simple distillation of the ammoniacal liquor and slight heating of the residue suffices to redeliver the ammonia.

What I claim is:

1. The method of recovering rosin from coniferous woods or from resinous materials obtained therefrom which comprises converting the acid components of the resin into ammonium salts or ammonium soaps, treating an aqueous mixture of the same with a rosin solvent immiscible with the aqueous mixture, separating the mixture and resultant solution, and then recovering the rosin from the solution.

2. The method of recovering rosin from coniferous woods or from resinous materials obtained therefrom which comprises treating the same with an ammonia solution, subjecting said solution to the action of a rosin solvent immiscible with the ammonia solution, separating out the solvent carrying the rosin content and then separating the solvet from such rosin content.

3. The method of recovering rosin from coniferous woods which comprises extracting the wood with an aqueous ammonia solution, treating the resultant ammonia solution with a rosin solvent which is immiscible with said solution, separating the solutions and distilling to recover the rosin, the solvent and the ammonia.

4. The process which comprises treating ammonium abietate in aqueous solution with a volatile solvent for abietic acid which is immiscible with water and then separating out the solvent carrying the abietic acid.

5. The process of recovering rosin from resinous wood or from resinous materials obtained therefrom which comprises treating same with an ammonia solution, agitating said solution with a rosin solvent immiscible with water until a transformation takes place which is evidenced by a change in the nature of the sound of the agitated liquor on impact, separating out the solvent carrying the extracted material and then separating the solvent from such extracted matter.

6. The process of recovering rosin from an aqueous solution of ammonium abietate or ammonium rosin soap, which includes agitating the same with a rosin solvent immiscible with water until the abietic acid therefrom is dissolved in the solvent and the ammonia is absorbed by the water.

7. The process of recovering pure abietic acid from impure material containing the same which comprises forming an aqueous ammoniacal solution of such material, extracting abietic acid from said solution by agitating the same with a water-immiscible solvent for abietic acid and recovering abietic acid from the solution so formed.

In witness whereof, I have hereunto set my hand this 23rd day of August, 1920.

FRANK E. GREENWOOD.